United States Patent [19]

Kressdorf et al.

[11] Patent Number: 5,484,826
[45] Date of Patent: Jan. 16, 1996

[54] FREE-FLOWING, QUICK-DISSOLVING LACQUER BINDER GRANULES

[75] Inventors: Burkhard Kressdorf, Walsrode; Erhard Lühmann, Bomlitz; Lutz Hoppe, Walsrode, all of Germany

[73] Assignee: Wolff Walsrode Aktiengesellschaft, Walsrode, Germany

[21] Appl. No.: 345,279

[22] Filed: Nov. 28, 1994

Related U.S. Application Data

[63] Continuation of Ser. No. 48,102, Apr. 15, 1993, abandoned.

[30] Foreign Application Priority Data

Apr. 28, 1992 [DE]  Germany .......................... 42 13 878.7

[51] Int. Cl.⁶ .......................... C09D 7/14; C09D 101/08; C09D 101/18
[52] U.S. Cl. .......................... 524/35; 524/37; 524/716; 524/733; 523/334; 536/38; 106/195
[58] Field of Search .......................... 524/35, 37, 716, 524/733; 106/95; 523/334; 536/38

[56] References Cited

U.S. PATENT DOCUMENTS

| | | | |
|---|---|---|---|
| 3,741,781 | 6/1973 | Plazanet et al. | 106/195 |
| 3,948,675 | 4/1976 | Rat et al. | 106/195 |
| 4,113,917 | 9/1978 | Tugukuni et al. | 524/44 |
| 4,131,572 | 12/1978 | Brendley et al. | 428/457 |
| 5,011,874 | 4/1991 | Hoppe et al. | 524/733 |

FOREIGN PATENT DOCUMENTS

| | | | |
|---|---|---|---|
| 1273182 | 7/1968 | Germany . | |
| 2100412 | 7/1971 | Germany . | |
| 1771206 | 7/1972 | Germany | 536/38 |
| 2338852 | 11/1979 | Germany . | |
| 1336532 | 11/1973 | United Kingdom | 536/38 |

*Primary Examiner*—Paul R. Michl
*Assistant Examiner*—Andrew E. C. Merriam
*Attorney, Agent, or Firm*—William C. Gerstenzang; Sprung Horn Kramer & Woods

[57] ABSTRACT

The invention relates to free-flowing, quick-dissolving lacquer binder granules based on cellulose esters, more particularly cellulose nitrates, and to a process for their production.

3 Claims, No Drawings

FREE-FLOWING, QUICK-DISSOLVING LACQUER BINDER GRANULES

This application is a continuation, of application Ser. No. 08/048,102, filed on Apr. 15, 1993 now abandoned.

This invention relates to free-flowing, quick-dissolving lacquer binder granules based on cellulose esters, more particularly cellulose nitrates, and to a process for their production.

Since cellulose nitrates, as a paint raw material, can easily be ignited by impact or friction in the dry state, commercially available products must either contain a moistener in a quantity of at least 25% by weight or, alternatively, a gelatinizing desensitizing agent is incorporated in a concentration of at least 18% by weight in order to reduce the danger of ignition during storage and handling and also during transport. The moisteners used are, for example, ethanol, isopropanol or n-butanol and also water. These moisteners can give rise to considerable problems during the processing of NC-containing lacquers, because alcohols are troublesome in the adsorption units which normally follow the lacquering plants for reducing emissions. In addition, alcohols used in PUR lacquers are capable of reacting with the isocyanates present therein to form low molecular weight compounds which distinctly reduce the quality of the end product.

The use of inert solvents (for example toluene), as described in DE-A 3 041 085 or in U.S. Pat. No. 3,284,253, merely solves the problem of use in polyurethane lacquers. In addition, production involving a distillation step is extremely complicated and problematical in safety terms. All solvent-moistened cellulose nitrates are attended by the problem of solvent evaporation and uneven distribution through sinking of the moistener in the cask. In addition, metering, particularly automatic metering, in the production process is extremely difficult on account of the wool-like structure of these products.

Accordingly, processes have been developed to enable cellulose nitrate to be made available in the form of pellets or so-called chips. Plasticizers are used as a gelatinizing desensitizing agent in such processes. Dibutyl phthalate and dioctyl phthalate have hitherto been used as the plasticizers. DE 1 203 652 describes a process for applying a plasticizer to water-moist cellulose nitrate. The plasticizer is sprayed onto the water-moist cellulose nitrate and is then mechanically incorporated, preferably at relatively high temperatures (>50° C.). However, the plasticizer is always unevenly distributed. the end products are flakes of irregular size. The water is then squeezed off and the material is dried. However, this process is only suitable for low-viscosity, readily gelatinizing plasticizers, such as dibutyl phthalate. The uneven application of the plasticizer also leads to a tendency towards blocking and, in addition, increases the danger of ignition of the products. The products are horn-like and extremely difficult to dissolve.

DOS 1 470 860 and DOS 1 570 121 describe the application of dioctyl phthalate which has a higher viscosity than dibutyl phthalate and does not gelatinize as well. In this case, the plasticizer dissolved in a solvent is incorporated in the cellulose nitrate. This process requires complicated solvent recovery and leads to poorly soluble products which also have a tendency towards blocking.

FR 2 112 705 and DE 2 215 624 describe a process for the production of polyol-modified cellulose nitrates in which an aqueous emulsion of a polyol is mixed and heated with an aqueous cellulose nitrate dispersion in the presence of a large quantity of emulsifier (up to 5% by weight). After filtration, the filter cake is calendered to the desired layer thickness and processed to flakes. These flakes are confined to use as polyurethane prepolymers. The calendering process gives rise to the formation of poorly soluble products. The emulsifiers present adversely affect the lacquer properties, particularly resistance to water.

In the process described in DE 2 100 412, a polyol is applied to the cellulose nitrate in a mixture of water and solvent in the presence of a protective colloid. Water and solvent then have to be distilled off in a complicated process.

DE 2 338 852 describes a process for the production of plasticized cellulose nitrate in which a suspension of dibutyl phthalate or dioctyl phthalate is applied to the cellulose nitrate with stirring over a period of 5 to 6 h. The application time is far too long for economic utilization of the process. Despite the uneconomically long application time required, the filtrate is clouded and the plasticizer is unevenly distributed in the product (see Comparison Example (3)).

CH 418 951 describes a process for incorporating dibutyl phthalate in cellulose nitrate in which an aqueous plasticizer emulsion is added to an aqueous suspension of cellulose nitrate. An extremely long contact time of 1 to 2 h is necessary. The product is subsequently freed from water by centrifugation and compacting rolling. The material accumulating has to be size reduced. The chips have the same poor solubility as the commercially available products according to DE 1 203 652 and DE 1 470 860 which are also produced by rolling (see above and the Examples).

U.S. Pat. No. 2,109,599 describes a process for the production of gelatinized cellulose nitrate by incorporation of polymethyl methacrylate and dibutyl phthalate on heated rollers after the polymer/plasticizer mixture has been applied to alcohol-moist cellulose nitrate in a kneader. In this process, the alcohol is evaporated on the hot rollers so that complicated solvent recovery is necessary. In addition, the material is exposed to high temperatures. This results in heavily compacted products of very poor solubility.

The cellulose nitrate products described above cannot be processed with modern automated metering systems on account of their poor flow properties.

The present invention relates to quick-dissolving, non-blocking cellulose ester granules, more particularly cellulose nitrates, which are desensitized with lacquer binders or lacquer components and which do not have any of the disadvantages mentioned above and also to a process for their production which may advantageously be integrated into the normal production process of the cellulose nitrate after the pressure boiling step (to reduce molecular weight) and a preliminary stabilizing step carried out to a pH value of 2.5 to 3.5.

The desensitized cellulose esters according to the invention are preferably produced using cellulose nitrates of various viscosity stages and having a nitrogen content of 10 to 12.6% by weight, more preferably cellulose nitrates which are taken from the normal production process after the pressure boiling step and which still have an acidic pH value. However, other cellulose esters, such as cellulose acetobutyrate or cellulose acetate, may also be used.

Preferred products are those which consist of 82 to 40% by weight and preferably 82 to 60% by weight cellulose nitrate and 18 to 60% by weight and preferably 18 to 40% by weight of a lacquer binder or another lacquer component except solvents. Suitable lacquer binders are any liquid resins compatible with cellulose nitrate, for example from the following groups: alkyd resins, saturated polyesters, unsaturated polyesters, OH-functional polyesters, polyester acrylates, polyacrylates, ketone resins, maleate resins, polyurethane resins, epoxy resins, silicone resins and mixtures of these resins, preferably self-emulsifiable resins.

Other suitable lacquer components are, for example, plasticizers, such as phthalic acid esters, more particularly phthalic acid esters with alcohols containing more than 7 carbon atoms, which hitherto could only be processed using solvents, such as dioctyl phthalate, diisononyl phthalate, diisodecyl phthalate; adipic acid esters, more particularly adipic acid esters with alcohol radicals containing more than 7 carbon atoms, such as dioctyl adipate; polymeric plasticizers, more particularly polyesters of dicarboxylic acids and polyhydric alcohols, such as for example the polyesters of adipic, sebacic or phthalic acid with butanediol, propylene glycol or trimethylol propane, optionally modified with monofunctional alcohols and acids, phosphoric acid esters, such as tri-n-butyl phosphate, tri-(2-ethylhexyl)-phosphate, tricresyl phosphate, azaleic acid esters, esters of higher fatty acids, glycolic acid esters, trimellitic acid esters, such as trioctyl trimellitate; sulfonic acid esters, such as dialkyl-$(C_{13-21})$-sulfonic acid esters of phenol/cresol mixtures, or esters of p-toluene sulfonic acid with phenols; citric acid esters, such as acetyl triethyl citrate or acetyl tri-2-ethylhexyl citrate; acetals; ketones, sulfonic acid amides, such as benzene sulfonic acid-N-methyl amide; epoxidized plasticizers, more particularly epoxidized esters of natural fatty acids, and epoxidized triglycerides, such as epoxidized soybean oil or linseed oil, natural resin esters, such as the esters of colophony or hydrogenated colophony; sugar derivatives, such as sucrose acetoisobutyrate; polycaprolactones; polymerizable plasticizers and flame-retarding plasticizers, such as trichloropropyl phosphate, trichloroethyl phosphate or diphenyloctyl phosphate, and ethoxylated derivatives of the products mentioned above, such as for example ethoxylated phosphoric acid esters, and mixtures of lacquer components, such as resins and plasticizers.

The granules according to the invention are produced by addition of an emulsion of a lacquer component to an aqueous suspension of the cellulose nitrate.

Conversely, however, solid cellulose nitrate or a cellulose nitrate suspension may also be added to an emulsion of the lacquer components.

It is preferred to add a concentrated emulsion to the cellulose nitrate suspension, more particularly to the cellulose nitrate suspension which is formed in the washing step after the pressure boiling step in the normal cellulose nitrate production process and which still has an acidic pH value. It was not foreseeable to the expert that particularly good granule formation with a complete conversion, characterized by a clear filtrate, would take place in the acidic medium or that the products would show excellent stability, because it had hitherto been assumed that the cellulose nitrate had to be washed to the neutral point and could only be further processed thereafter in order to achieve good stability values. In some cases, the effects according to the invention can also be obtained at a pH value above the preferred range of 2.5 to 3.5.

The emulsion is incorporated in this suspension by stirring. In many cases, there is no need to increase the temperature in order to improve gelatinization. The granules are then separated off and, if necessary, subsequently dried.

Emulsification may be carried out simply by stirring the lacquer components, the emulsifiers and the water and also by using dissolvers, ultrasonic mixers, jet mixers, throughflow dispersers and combinations of these methods.

The temperature may be varied or kept constant during the emulsification step. It may be in the range from 5° to 100° C. and is preferably in the range from 20° to 80° C.

Suitable emulsifiers are known nonionic or ionic surfactants or mixtures thereof. Suitable nonionic emulsifiers are, for example, ethoxylated and/or propoxylated alkylphenols, more particularly ethoxylated and/or propoxylated nonylphenols, fatty alcohol esters, ethoxylated and/or propoxylated fatty alcohols, fatty acid esters, polyglycol ethers of polypropylene glycol, ethoxylated and/or propoxylated fats and oils, ethoxylated and/or propoxylated condensed phenols, ethoxylated and/or propoxylated condensed amines, ethoxylated and/or propoxylated polysiloxanes and mixtures thereof.

Suitable anionic emulsifiers are, for example sulfonates, such as fatty acid sulfonates, sulfonated esters, perfluorinated alkyl sulfonates, alkyl benzene sulfonates and condensed sulfonates; sulfates, such as sulfated alcohols, sulfated esters, sulfated alkanolamides, sulfated mono- and polyglycerides and sulfated polyglycol ethers; or even the corresponding phosphates and also complex phosphates.

Nonionic and anionic emulsifiers and mixtures and nonionic and anionic emulsifiers in concentrations of 0 to 1% by weight and, more particularly, in concentrations of 0.05 to 0.5% by weight, based on the anhydrous lacquer binder granules, are particularly preferred.

With readily emulsifiable substances, there may be no need at all to use emulsifiers.

Mixing of the emulsion with the aqueous cellulose nitrate may be carried out in a normal stirred vessel at temperatures in the range from 0° to 100° C. and preferably at temperatures in the range from 20° to 80° C. The emulsion may be applied under normal pressure, elevated pressure or reduced pressure. In a particularly preferred embodiment, the emulsion is applied to the aqueous cellulose nitrate mixture under reduced pressure. This process step also leads to very even absorption of the lacquer component by the cellulose ester fibers and hence to a particularly homogeneous product.

After the lacquer component has been absorbed by the cellulose ester fibers, which is characterized by disappearance of the clouding of the aqueous phase, the particles are separated by normal liquid/solid separation techniques, such as centrifugation, filtration or decantation.

Complete absorption of the lacquer component takes place within at most 30 minutes of the absorption temperature being reached and is characterized by disappearance of the clouding of the aqueous phase.

The moist granules may be dried in standard dryers, such as tray dryers, belt dryers or fluidized bed dryers. Free-flowing water-free granules are produced in this way.

Depending on their composition, the cellulose ester/lacquer component granules according to the invention, which may even be combined with other lacquer binders or lacquer additives, are suitable for lacquers of various types, for example for wood, metal, plastic, paper or leather lacquers, and also for lacquering magnetic data carriers or mineral substrates.

Extensive literature is available on possible combination partners for these granules, of, for example "Karsten, Lackrohstofftabellen", 8th Edition, Kurt R. Vincenz Verlag, Hannover, 1987.

Transparent or pigmented lacquers may be produced.

EXAMPLES

Test methods:

1. Determination of the deflagration temperature

The deflagration temperature is determined in accordance with Appendix I of the International Directive for the Transport of Hazardous Materials by Rail (RID).

0.2 g dried cellulose nitrate products are placed in a test tube 125 ml long with an internal diameter of 15 mm and a wall thickness of 0.5 mm and introduced into a Wood metal bath heated to 100° C. The test tube must dip into the bath to a depth of exactly 20 mm. In addition, the middle of the mercury ball of the thermometer used must be level with the bottom of the test tube. By heating, the temperature of the bath is increased by 5° C. per minute so that a temperature of 170° C. is reached after 14 minutes.

Commercially available cellulose nitrate chips have a deflagration temperature above 170° C.

2. Stability by the Bergmann-Junk test (Zeitschrift für Angewandte Chemie, 1904, pages 982 and 1074)

In a Bergmann-Junk apparatus kept constant at 132° C., the tube filled with a quantity of sample corresponding to 2 g dry cellulose nitrate is heated for 2 hours and the quantity of nitrous gases given off after reduction to nitrogen monoxide is determined.

Cellulose nitrate products which give off no more than 2.5 ml nitrogen monoxide per g cellulose nitrate present are stable in the context of this test.

3. Dissolving time 45 g of the cellulose nitrate product are rapidly added to 255 g ethyl acetate while stirring with a dissolver (dissolver disc, diameter 40 mm) at 930 r.p.m. The time required for uniform dissolution is the dissolving time.

Commercially available cellulose nitrate chips containing 18% dibutyl phthalate produced by the process according to DE 1 203 652 and DE 1 470 860 have dissolving times of 40 to 60 minutes.

4. Transmission

To characterize the clouding of the filtrate formed in the production process according to the invention, transmission is determined at a wavelength of 600 mm and with a layer thickness of 1 mm.

Example 1

35 g diisononyl adipate are mixed with 0.175 g of an aqueous solution of an alkyl sulfosuccinate (Bevaloid 1299, Bevaloid Ltd., UK). Using an Ultraturrax, an emulsion is prepared by addition of 35 g water at room temperature. The emulsion is then emulsified for another 5 minutes at low speed.

A suspension of 49.3 g cellulose nitrate of the standard 34 E type in 238 g water (pH 3.2) is introduced into a stirred vessel. 23.4 g of the emulsion described above are added to this mixture which is then heated with stirring to 60° C. and left at that temperature for 15 minutes. After cooling to 40° C., the coarse-particle suspension formed is filtered and the solid is dried in a fluidized-bed dryer. The granules containing cellulose nitrate and diisononyl adipate are free-flowing and form a clear solution in ethyl acetate. The filtrate is completely clear.

The results of the stability test (Bergmann-Junk test) and the deflagration temperature are very good. The dissolving time is considerably shorter than that of commercially available cellulose nitrate chips (see test methods, dissolving time).

Yield: 99.1%

Particle diameter: 0.2–1 mm

Bergmann-Junk test: 1.1 ml

Deflagration temperature: 184°–185° C.

Dissolving time: 2.5 mins.

Appearance of the filtrate: Clear

Transmission of the filtrate: 98.7

Example 2

23.4 g of the emulsion described in Example 1 are added to a suspension of 50.0 g cellulose nitrate of the standard 24 E type in 330 g water (pH 3.1). Further processing is carried out in the same way as described in Example 1. The coarse-particle, non-blocking agglomerate obtained dissolves clearly in ethyl acetate.

Yield: 98.2%

Particle diameter: 0.5–1.5 mm

Bergmann-Junk test: 0.9 ml

Deflagration temperature: 188° C.

Dissolving time: 2.75 mins.

Appearance of the filtrate: Clear

Example 3

23.4 g of the emulsion described in Example 1 are added to a suspension of 50.0 g cellulose nitrate of the standard 12 E type in 580 g water (pH 3.1). Further processing is carried out in the same way as described in Example 1.

The granules formed dissolve clearly in ethyl acetate.

Yield: 99.2%

Particle diameter: 2–3 mm

Bergmann-junk test: 0.8 ml

Deflagration temperature: 186.0°–186.5° C.

Dissolving time: 10.5 mins.

Appearance of the filtrate: Clear

Example 4

6,650 g water and 0.7 g of an ethoxylated nonylphenol containing on average 9 EO units are mixed in a stirred vessel. Using a dissolver, an emulsion is prepared by addition of 350 g di-2-ethylhexyl phthalate at room temperature.

The emulsion described above is added to 2,046.8 g moist cellulose nitrate of the standard 34 E type, water content 32.6% (pH 3.0), in a stirred vessel. The mixture is heated with slow stirring to 60° C. and left at that temperature for 15 minutes. After cooling to 40° C., the coarse-particle suspension formed is filtered and the solid is dried in a recirculating air dryer. The granules formed are free-flowing and dissolve clearly in ethyl acetate.

Granules which dissolve clearly in ethyl acetate are formed.

Yield: 99.1%

Particle diameter: 0.3–0.7 mm

Bergmann-Junk test: 0.6 ml

Deflagration temperature: 184° C.

Dissolving time: 2.0 mins.

Appearance of the filtrate: Clear

Example 5

A suspension of 1,200 g cellulose nitrate of the standard 27 E type in 1,234 g water (pH 3.5) is introduced into a stirred vessel and 433 g of an emulsion of a middle-oil alkyd resin (Jägalyd WE 57, a product of Jäger, 65% in water) are added.

After 15 minutes, the suspension formed is filtered and the solid is dried in a fluidized bed dryer. The granules formed are free-flowing and dissolve clearly in ethyl acetate.

Yield: 99.0%

Particle diameter: 0.4–0.7. mm

Bergmann-Junk test: 1.0 ml

Deflagration temperature: 180.5° C.

Dissolving time: 4.5 mins.

Appearance of the filtrate: Clear

Transmission of the filtrate: 99.1%

Example 6

35 g water are mixed with 0.175 g ethoxylated primary $C_{13-15}$ alcohol containing on average 11 ethylene oxide units. An emulsion is prepared by slow addition of 35 g sucrose acetobutyrate with intensive shearing at 60° C.

23.4 g of the emulsion described above are added to a suspension of 50 g cellulose nitrate of the standard 34 E type in 237 g water (pH 2.9) in a stirred vessel, the mixture is heated with stirring to 60° C. and is left at that temperature for 15 minutes. After cooling to 40° C., the coarse-particle suspension formed is filtered and the solid is dried in a fluidized bed dryer. The granules are free-flowing and dissolve clearly in ethyl acetate.

Yield:

Particle diameter: 0.3–0.7 mm

Bergmann-Junk test: 0.9 ml

Deflagration temperature: 179° C.

Dissolving time: 2.0 mins.

Appearance of the filtrate: Clear

Transmission of the filtrate: 98.7%

Example 7

70 g water are mixed with 0.35 g ethoxylated nonylphenol containing on average 50 EO units. An emulsion is prepared by addition of 23.3 g epoxidized soybean oil with intensive shearing at room temperature.

A suspension of 50 g cellulose nitrate of the standard 32 E type in 237 g water (pH 2.9) is introduced into a stirred vessel and 23.5 g of the emulsion described above are added. The suspension is stirred for 15 minutes at room temperature and filtered and the solid is dried in a recirculating air oven. Free-flowing granules which dissolve clearly in ethyl acetate are obtained.

Yield: 99.6%

Particle diameter: 0.3–0.8 mm

Bergmann-Junk test: 0.8 ml

Deflagration temperature: 181° C.

Dissolving time: 4.5 mins.

Appearance of the filtrate: Clear

Transmission of the filtrate: 99.2

Example 8

0.175 g of an ethoxylated nonylphenol containing on average 9 mol ethylene oxide per mol emulsifier is added to 35 g water. An emulsion is prepared by addition of 35 g diisononyl phthalate with intensive shearing at room temperature.

23.4 g of the emulsion described above are added to a suspension of 50 g cellulose nitrate of the standard 34 E type in 237 g water (pH 2.9) in a stirred vessel. After heating with stirring to 60° C., the mixture is left at that temperature for 15 minutes. After cooling to 40° C., the coarse-particle suspension formed is filtered and the solid is dried in a fluidized-bed dryer. The granules formed are free-flowing and dissolve clearly in ethyl acetate.

Yield: 99.5%

Particle diameter: 0.5–0.9 mm

Bergmann-Junk test: 0.8 ml

Deflagration temperature: 179° C.

Dissolving time: 3.5 mins.

Appearance of the filtrate: Clear

Example 9

1.4 g of a mixture of Ca dodecyl benzene sulfonate and polyoxyalkylene aryl ethers (ATLOX 4880 B, a product of ICI Speciality Chemicals, Essen) is added to 35 g water. An emulsion is then prepared by slow addition of 35 g phthalic acid polyester (Ultramoll PP, a product of Bayer AG, Leverkusen).

23.4 g of the emulsion described above are added to a suspension of 50 g cellulose nitrate of the standard 34 E type in 237 g water (pH 3.1) in a stirred vessel. After heating with stirring to 60° C., the mixture is left at that temperature for 15 minutes. After cooling to 40° C., the coarse-particle suspension formed is filtered and the solid is dried in a fluidized-bed dryer. The granules formed are free-flowing and dissolve clearly in ethyl acetate.

Yield: 98.9%

Particle diameter: 0.5–0.9 mm

Bergmann-Junk Test: 0.6 ml

Deflagration temperature: 178° C.

Dissolving time: 4.0 mins.

Appearance of the filtrate: Clear

Example 10

70 g water are mixed with 0.35 g ethoxylated nonylphenol containing 50 mol EO units. An emulsion is then prepared by slow addition of 23.3 g diphenyl octyl phosphate (Disflamoll, a product of Bayer AG) in a dissolver at room temperature.

23.5 g of the emulsion described above are added to a suspension of 50 g cellulose nitrate of the standard 32 E type in 237 g water (pH 3.2) in a stirred vessel. The suspension is stirred for 15 minutes at room temperature and is then filtered and the solid is dried in a recirculating air oven. Free-flowing granules which dissolve clearly in ethyl acetate are obtained.

Yield: 99.9%

Particle diameter: 0.6–0.9 mm

Bergmann-Junk test: 0.6 ml

Deflagration temperature: 180° C.

Dissolving time: 2.5 mins.

Appearance of the filtrate: Clear

Example 11

0.035 g of a mixture of Ca dodecyl benzene sulfonate and polyoxyethylene polyesters (ATLOX 4851 B, a product of ICI Speciality Chemicals, Essen) is added to 35 g water. An emulsion is then prepared by slow addition of 35 g trichloropropyl phosphate in a dissolver.

23.4 g of the emulsion described above are added to a suspension of 50 g cellulose nitrate of the standard 32 E type in 237 g water (pH 2.5) in a stirred vessel. After 15 minutes, the coarse-particle suspension formed is filtered and the solid is dried in a fluidized bed dryer. The granules formed are free-flowing and dissolve clearly in ethyl acetate.

Yield: 99.3%

Particle diameter: 0.4–0.7 mm

Bergmann-Junk test: 0.8 ml

Deflagration temperature: 177°–178° C.

Dissolving time: 3,0 mins.

Appearance of the filtrate: Clear

Transmission of the filtrate: 98.2%

Comparison Example 1

Example 11 is repeated with a cellulose nitrate suspension having a pH value of 7.0. The filtrate is cloudy and the granules form a cloudy solution in ethyl acetate. The yield is also poorer than in Example 11.

Yield: 96.8%

Particle diameter: 0.5–0.7 mm

Bergmann-Junk test: 1.1 ml

Deflagration temperature: 175° C.

Dissolving time: 3.2 mins.

Appearance of the filtrate: Cloudy

Transmission of the filtrate: 9%

Comparison Example 2

Example 7 is repeated with a cellulose nitrate suspension having a pH value of 7.0. The filtrate is cloudy and the granules form a cloudy solution in ethyl acetate. The yield is also poorer than in Example 7.

Yield: 97.1%

Particle diameter: 0.4–0.8 mm

Bergmann-Junk test: 0.9 ml

Deflagration temperature: 180° C.

Dissolving time: 4.5 mins.

Appearance of the filtrate: Cloudy

Transmission of the filtrate: 16.1%

Comparison Example 3

Example 1 of DE 233 852 was repeated using 20% dibutyl phthalate, based on the total solids content. A cellulose nitrate of the standard 34 E type was used.

Despite a residence time of 6 hours, the plasticizer was not completely absorbed by the cellulose nitrate. The aqueous phase is cloudy. In addition, the cellulose nitrate obtained is not completely granulated. Fibrous constituents are clearly discernible. A product such as this cannot be marketed as desensitized cellulose nitrate. On account of the uneven wetting with plasticizer, the Bergmann-Junk value, the deflagration temperature and the dissolving time cannot be exactly determined.

Yield: 94.3%

Particle diameter: 0.3–12 mm

Appearance of the filtrate: Very cloudy

Transmission of the filtrate: 6.3%

We claim:

1. A process for the production of free-flowing quick-dissolving cellulose-nitrate granules, comprising the steps of:
    a) Forming an emulsion of a lacquer resin, plasticizer or mixture thereof in water;
    b) Mixing said emulsion with an aqueous suspension of cellulose nitrate, said suspension having a pH of 2.5 to 3.5;
    c) Separating the suspended matter from said mixture; and
    d) Drying said separated, suspended matter and forming granules thereof.

2. A process in accordance with claim 1, wherein nonionic and anionic emulsifiers are used in concentrations of 0 to 1% by weight based on the water-free lacquer binder granules.

3. Products obtained by the process claimed in claim 1, characterized in that they have a considerably improved solubility in relation to known products.

* * * * *